United States Patent
Kaminski et al.

(10) Patent No.: US 6,844,655 B2
(45) Date of Patent: Jan. 18, 2005

(54) EXPANDABLE FLAT WINDING FOR ROTATING ELECTRIC MACHINE FIELDS

(75) Inventors: Christopher Anthony Kaminski, Niskayuna, NY (US); Robert John Nygard, Saratoga Springs, NY (US); Yu Wang, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 29 days.

(21) Appl. No.: 10/254,727

(22) Filed: Sep. 25, 2002

(65) Prior Publication Data

US 2003/0020361 A1 Jan. 30, 2003

Related U.S. Application Data

(63) Continuation-in-part of application No. 09/684,485, filed on Oct. 10, 2000, now abandoned.
(60) Provisional application No. 60/169,242, filed on Dec. 6, 1999.

(51) Int. Cl.[7] ........................... H02K 55/04; H02K 3/51
(52) U.S. Cl. ...................... 310/262; 310/262; 310/208; 310/216; 310/270; 29/598; 29/606
(58) Field of Search ............................... 310/201, 270, 310/261, 262, 61, 64, 179, 198, 208, 68 D, 59, 269

(56) References Cited

U.S. PATENT DOCUMENTS

| | | | | |
|---|---|---|---|---|
| 2,844,746 A | * | 7/1958 | Coggeshall | 310/201 |
| 3,999,091 A | * | 12/1976 | Kirtley, Jr. et al. | 310/52 |
| 4,614,888 A | * | 9/1986 | Mosher et al. | 310/261 |
| 5,548,168 A | * | 8/1996 | Laskaris et al. | 310/52 |
| 5,644,179 A | * | 7/1997 | Staub et al. | 310/65 |
| 5,785,114 A | * | 7/1998 | Armstrong et al. | 165/47 |

FOREIGN PATENT DOCUMENTS

| | | | | |
|---|---|---|---|---|
| FR | 2 465 349 | * | 9/1979 | H02K/1/24 |
| FR | 2465349 | * | 9/1979 | H02K/1/24 |
| JP | 08-08005 | * | 3/1996 | H02K/3/52 |
| JP | 08-080005 | * | 3/1996 | H02K/3/52 |
| SE | 89234 | * | 3/1937 | 310/262 |

OTHER PUBLICATIONS

Translation of Pohl, Sweedish Patent 89,234, May 11, 1937.*

* cited by examiner

*Primary Examiner*—Karl Tamai
(74) *Attorney, Agent, or Firm*—Ann M. Agosti; Patrick K. Patnode

(57) ABSTRACT

A winding module for an electric machine is provided wherein the winding module comprises a flat field winding that is angled at an end turn and wherein a vertex of the flat field winding is aligned with an axis of rotation. The vertex provides a predetermined axial offset so as to compensate for a radial expansion of the flat field winding when it is disposed to a centrifugal force.

8 Claims, 4 Drawing Sheets

EXPANDABLE FLAT WINDING FOR ROTATING ELECTRIC MACHINE FIELDS

CROSS REFERENCE TO RELATED APPLICATIONS

This application is a continuation-in-part of U.S. application Ser. No. 09/684,485, filed Oct. 10, 2000 now abandoned, which claims priority to and the benefit of the filing date of U.S. Provisional Application Ser. No. 60/169,242, filed Dec. 6, 1999, the entire content of which are herein incorporated by reference.

BACKGROUND OF INVENTION

The present invention relates to rotational electric machines and, more particularly, to a multi-piece two-pole generator rotor including flat for machine fields.

In electric machines having a rotor and a stator, the rotor is provided with field windings, and the stator is provided with armature windings. The rotor is typically provided with rotor spindles to effect rotation. With this structure, however, the spindles on each end of the rotor body require the ends of the field winding to be formed into an arc concentric with the spindle. See, e.g., FIG. 1. This rotor construction including a one-piece rotor forging and end winding modules having curved ends is described in co-pending U.S. patent application Ser. No. 09/491,504, filed Jan. 26, 2000.

It is desirable to flatten the winding construction of the prior end winding modules and eliminate the arcs required for concentricity with the spindle. A flattened winding construction is described in U.S. Pat. No. 6,437,476. Flat windings with straight end turns extending diametrically across the rotor, however, are susceptible to elongation under the pull of centrifugal forces. The introduction of a predetermined axial offset can allow the end arms to lengthen and shorten with changes in rotor speed, without suffering elongation. On the other hand, the unsupported end arm will be subject to minimum induced centrifugal forces and effect support from the straight section of the winding.

BRIEF SUMMARY OF INVENTION

In an exemplary embodiment of the invention, a winding module for an electric machine comprises a flat field winding that is angled at an end turn, wherein a vertex of the flat field winding is aligned with an axis of rotation. The vertex provides a predetermined axial offset so as to compensate for a radial expansion of the flat field winding when it is disposed to a centrifugal force.

DETAILED DESCRIPTION

Figure 1:
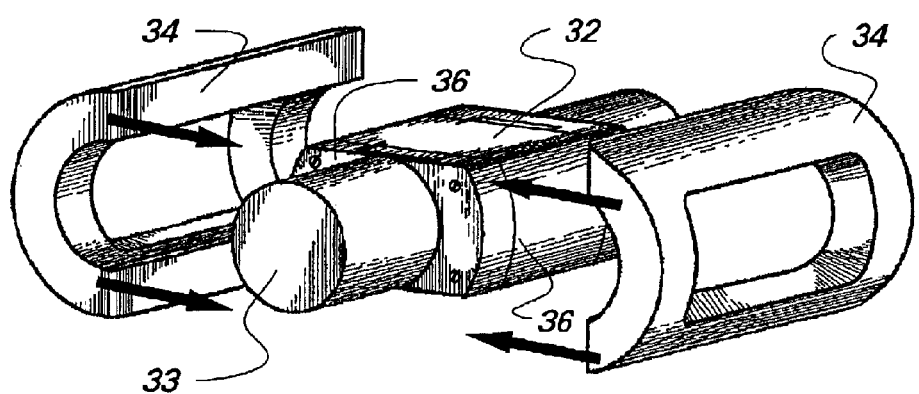
FIG. 1 illustrates a generator rotor assembly including a one-piece rotor forging and end winding modules with curved ends.

The rotor assembly of the noted co-pending U.S. Patent Application is shown in FIG. 1. The assembly includes a multi-pole magnetic core 32 (two-pole core shown) including spindles 33 and receiving a plurality of winding assemblies 34, one for each pole. Corresponding pole faces 36 are formed at ends of the rotor forging. As shown, the winding assemblies 34 are slid over the parallel sided forging of the two-pole magnetic core 32. These winding assemblies 34 are curved into an arc concentric with the spindles 33 to accommodate the spindles 33. It is desirable, however, to flatten the winding construction for simplicity and to reduce associated manufacturing and assembly costs.

Figure 4:
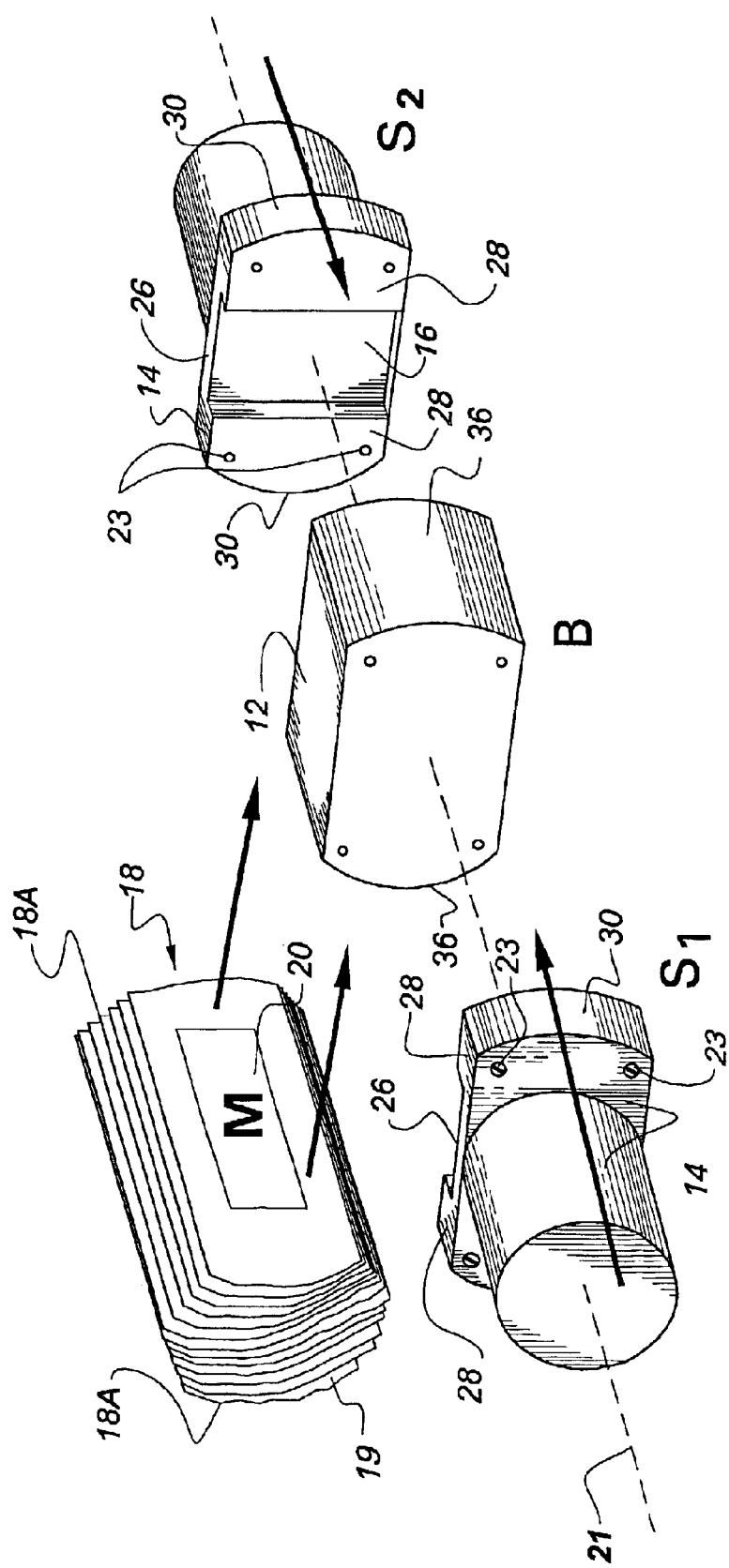
FIG. 4 is an assembly drawing of a generator rotor accommodating the flat windings of the present invention.

FIG. 4 is an assembly drawing of a generator rotor of the present invention. As shown, the rotor forging is divided into at least three pieces including a rotor body 12 and a pair of generally tuning fork-shaped spindles 14. The so-shaped spindles 14 define notches 16 therein. A winding module 18 includes a plurality of flat field windings 19 disposed end-to-end and include openings 20 therein that are sized to fit over the rotor body 12. The end-to-end construction of the flat field windings 19 is formed using standard layered winding methods. As shown, each of the flat field windings 19 of the winding module 18 have a smaller perimeter at outside ends of the winding module 18, tapering toward a largest perimeter at a middle of the winding module 18. In one embodiment, the flat field windings 19 are typically comprise copper windings. The electric machine (not shown), comprising winding module 18, is typically cooled by air, Hydrogen gas or water. In addition, the operating temperature of the winding module is typically in the range between about −45° C. and about 160° C. Such operating temperature is typically dictated by the electrical insulation performance and rotor dynamic behavior of the electric machine. By contrast, typical superconducting electric machines operate in cryogenic temperatures where a superconducting conductor reaches zero electrical resistance. As such, these typical superconducting electric machines typically operate in the range between about 4 K (about −270° C.) and about 77 K (about −196° C.).

Figure 2:
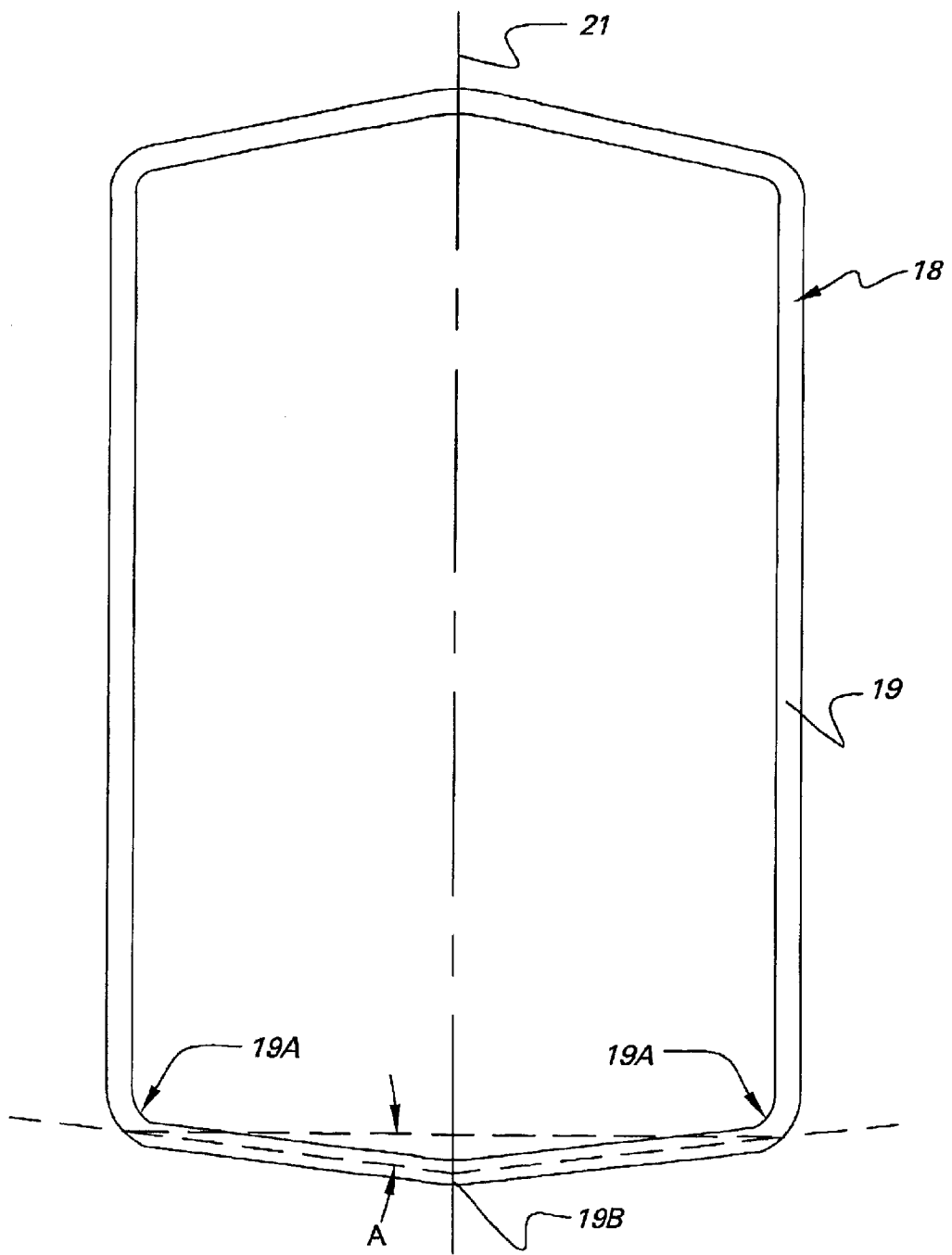
FIG. 2 illustrates a flat winding component of the present invention.

FIG. 2 illustrates the flat field winding 19 of the winding module 18 of the present invention. The flat field winding 19 includes a shallow angle 19A in each end turn including a vertex 19B that is aligned with an axis of rotation 21 of the rotor field. The shallow angle 19A in each end turn along with each respective vertex 19B define a predetermined axial offset that allows the end arms to lengthen and shorten with changes in rotor speed and temperature, without suffering structural damage because of excessive elongation of the flat field windings 19. As used herein, the term "predetermined axial offset" refers to a predetermined angle (designated "A" in drawing FIG. 2) defining an offset predetermined for a radial expansion range of the flat field winding 19 wherein such expansion is typically created when the flat field windings 19 are disposed to centrifugal forces during operation. In addition, the predetermined axial offset serves to compensate for a radial tolerance of the winding module 18 so as to fit into a structural support enclosure (not shown), typically a cylindrical enclosure, during assembly. As such, it will be appreciated that the predetermined axial offset construction serves to minimize the winding stresses in the winding module 18 in different manufacturing and operating conditions.

Figure 3:
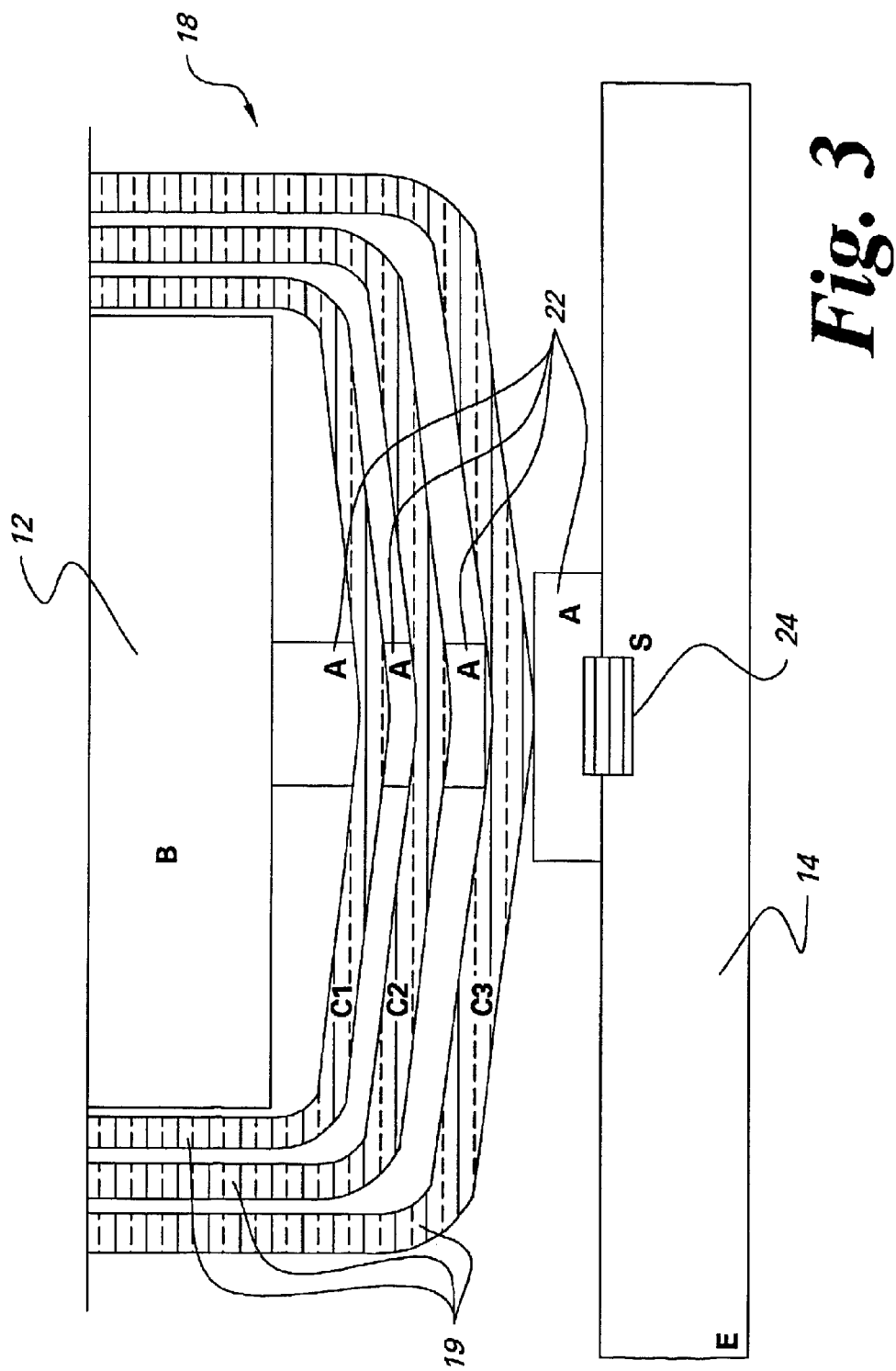
FIG. 3 illustrates an example using a three-coil winding.

FIG. 3 illustrates an example using a three-coil winding with optional end winding blocking in the axial direction. Blocks 22 are inserted between the flat field windings or coils 19 along an axis of symmetry filling the space between the rotor body 12 and the brace that bridges the legs of the spindles 14. A spring 24 is inserted between the spindles 14 and an outermost one of the blocks 22 as shown. The spring 24 maintains the compression in the blocking as the axial arms of the winding expand with acceleration of the rotor to running speed.

The winding module 18 is fit over the parallel sides of the rotor body 12 with the spindles 14 separated from the rotor body 12. Once in place, the spindles 14 are secured to the rotor body by screws 23 or the like. The notch 16 in the spindles is sized to receive the ends 18A of the winding module 18. After fitting the winding module 18 over the parallel sides of the rotor body 12, the spindles 14 are secured to rotor body 12 via screws 23, and the outside surfaces of the spindles are substantially flush with the corresponding surfaces of the rotor body 12.

With the structure of the present invention, a winding module 18 incorporating flat field windings 19 including a predetermined axial offset allows the end arms of the flat field windings 19 to lengthen and shorten with changes in motor speed, without suffering elongation. Moreover, the predetermined axial offset serves to minimize the winding stresses in different operating conditions.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A rotor comprising:
    a rotor body defining pole faces and having parallel sides perpendicular to said pole faces;
    a flat field winding slideable over parallel sides of a rotor body of said electric machine and angled at an end turn, wherein the flat field winding comprises straight portion extending over the parallel sides of the rotor body, wherein a vertex of said flat field winding is aligned with an axis of rotation, said vertex providing a predetermined axial offset so as to compensate for a radial expansion of said flat field winding when disposed to a centrifugal force.

2. A rotor according to claim 1, comprising a plurality of flat field windings.

3. A rotor according to claim 2, further comprising blocks disposed between said flat field windings.

4. A rotor according to claim 1, wherein said flat field winding comprises copper windings.

5. A electric machine comprising:
    a rotor body defining pole faces and having parallel sides perpendicular to said pole faces;
    a winding module slidable over said parallel sides of said rotor body, the winding module including a flat field winding comprising straight portions extending over the parallel sides of the rotor body that is angled at an end turn,
    wherein a vertex of said flat field winding is aligned with an axis of rotation, said vertex providing a predetermined axial offset so as to compensate for a radial expansion of said flat field winding when disposed to a centrifugal force; and
    a pair of spindles secured to respective ends of said rotor body, said spindles securing ends of said winding module to said rotor body.

6. An electric machine according to claim 5, wherein the winding module comprises a plurality of flat field windings.

7. An electric machine according to claim 6, wherein said winding module further comprises blocks disposed between said flat field windings and said rotor body.

8. An electric machine according to claim 7, further comprising springs disposed between outermost ones of said blocks and said spindles, respectively.

* * * * *